(12) United States Patent
Guo et al.

(10) Patent No.: US 10,200,687 B2
(45) Date of Patent: Feb. 5, 2019

(54) SAMPLE ADAPTIVE OFFSET FOR HIGH DYNAMIC RANGE (HDR) VIDEO COMPRESSION

(71) Applicant: Apple Inc., Cupertino, CA (US)

(72) Inventors: Mei Guo, San Jose, CA (US); Jun Xin, Sunnyvale, CA (US); Yeping Su, Sunnyvale, CA (US); Chris Y. Chung, Sunnyvale, CA (US); Xiaosong Zhou, Campbell, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 61 days.

(21) Appl. No.: 15/612,880

(22) Filed: Jun. 2, 2017

(65) Prior Publication Data

US 2018/0352225 A1    Dec. 6, 2018

(51) Int. Cl.
| | |
|---|---|
| *H04N 19/117* | (2014.01) |
| *H04N 19/136* | (2014.01) |
| *H04N 19/186* | (2014.01) |
| *H04N 19/46* | (2014.01) |
| *H04N 19/157* | (2014.01) |
| *H04N 19/80* | (2014.01) |

(52) U.S. Cl.
CPC ......... *H04N 19/117* (2014.11); *H04N 19/136* (2014.11); *H04N 19/157* (2014.11); *H04N 19/186* (2014.11); *H04N 19/46* (2014.11); *H04N 19/80* (2014.11)

(58) Field of Classification Search
CPC .. H04N 19/117; H04N 19/136; H04N 19/157; H04N 19/186; H04N 19/46; H04N 19/80
See application file for complete search history.

(56) References Cited

U.S. PATENT DOCUMENTS

| | | | |
|---|---|---|---|
| 2016/0286226 A1* | 9/2016 | Ridge | H04N 19/30 |
| 2017/0105014 A1* | 4/2017 | Lee | H04N 19/30 |
| 2018/0152703 A1* | 5/2018 | Rusanovskyy | H04N 19/176 |
| 2018/0160126 A1* | 6/2018 | Andersson | H04N 19/186 |
| 2018/0167615 A1* | 6/2018 | Kim | H04N 19/186 |

* cited by examiner

*Primary Examiner* — Zhihan Zhou
(74) *Attorney, Agent, or Firm* — Baker & Hostetler LLP

(57) ABSTRACT

Methods of sample adaptive offset (SAO) for high dynamic range (HDR) video compression are disclosed. For band offset (BO), the sample range of each component is unequally divided into a number of bands based on the distribution of samples, the electro-optical transfer function (EOTF) of HDR source and one perceptually uniform EOTF. Each component may have a different number of bands, different number of signaled bands, and different range value for signaled offsets in BO mode. For edge offset (EO), Cb and Cr may use separate syntax elements. In the sample classification for EO, the difference between the current sample and its neighbor is compared with a threshold to determine whether it is a local valley, a local peak, or corners. A distortion measure for HDR source images are also disclosed.

16 Claims, 7 Drawing Sheets

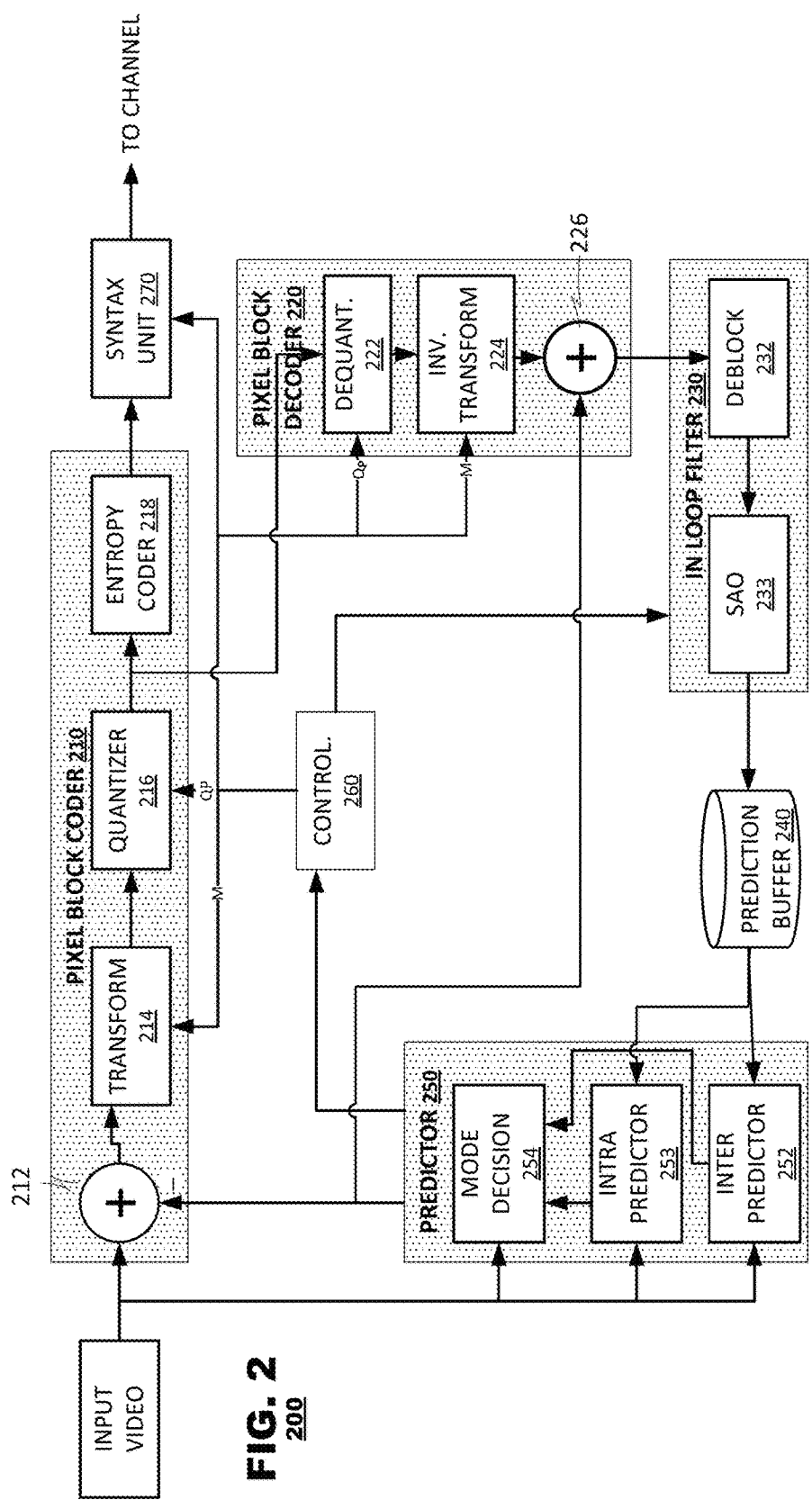

300

400

500

600

700

SAMPLE ADAPTIVE OFFSET FOR HIGH DYNAMIC RANGE (HDR) VIDEO COMPRESSION

BACKGROUND

The present disclosure is directed to video coding and decoding techniques and, in particular, to application of sample adaptive offset filters.

A sample adaptive offset (SAO) filter is a non-linear image data filter designed to improve reconstruction of original image samples, for example by reducing visual banding and ringing artifacts, and by reducing visual artifacts at edges. An SAO filter, such as is defined in the H.265 (also known as "HEVC") coding protocol, is applied within the prediction loop of a video encoder or decoder. The HEVC SAO filter includes classification of pixels and application to reconstructed image data of pixel value offsets from a lookup table. HEVC coding tree blocks (CTBs) may individually disable the SAO filter, or may enable the SAO filter in one of two modes: a band offset (BO) mode, or an edge offset (EO) mode. The SAO filter's lookup table is encoded into the compressed bitstream, and may be determined by an encoder, for example, based on a histogram or other statistical analysis of image data.

The HEVC BO mode applies an offset from the lookup table based on the amplitude (or value) of a single pixel sample. A pixel is categorized by its amplitude into one of 32 bands (histogram bins). Offsets are specified for only four consecutive of the 32 bands, because in flat areas which are prone to banding artifacts, sample amplitudes tend to be clustered in a small range.

The HEVC EO mode operates by comparing a pixel's value to two of its eight neighboring pixels using one of four directional gradient patterns. Based on a comparison with these two neighbors, the sample is classified into one of five categories: minimum, maximum, an edge with the sample having the lower value, an edge with the sample having the higher value, or monotonic. Then, for each of the first four categories, an offset from the lookup table is applied.

High dynamic range (HDR) digital image data has become common and may differ in various aspects from standard dynamic range (SDR) representations of video data. For example, HDR may allow for representations of a wider dynamic range of luminosity, may be a higher precision representation, and may use different electro-optical transfer function (EOTF). Compared to SDR processing, HDR processing uses a different EOTF and has a greater dynamic range of luminosity to reproduce the real world. An EOTF can define how to convert digital code words to linear luminance. An example of SDR EOTF is a Gamma EOTF, for example as defined in ITU-R BT.1886, while an example HDR EOTF is the perceptual quantizer (PQ) transfer function defined in SMPTE standard ST 2084.

With an HDR EOTF, coding distortion and activity measurements are related to the brightness of pixels.

The inventors have determined that presently-available SAO filtering techniques, such as the SAO filter in HEVC, do not provide optimal performance when applied to HDR image data. Accordingly, they have identified a need for improved SAO filtering techniques to improve the quality of HDR image data recovered by video decoders.

BRIEF DESCRIPTION OF THE DRAWINGS

FIG. 2 is an example functional block diagram of an example coding system.

DETAILED DESCRIPTION

Embodiments of the present disclosure provide techniques for modification and application of a sample adaptive offset (SAO) filter as may be employed in video encoding and decoding systems, and may be useful, for example, when applied to high dynamic range (HDR) image data. These techniques include application to HDR image data of an SAO filter in band offset (BO) filtering mode, an SAO filter in edge offset (EO) filtering mode, and converted measures of image distortion. According to these techniques for BO filtering, bands of the band offset filtering may have unequal size (bands may span differing amounts of pixel amplitude range), the number of bands may differ from known techniques (such as the known techniques of HEVC), and techniques for signaling offsets of certain bands in an encoded bitstream may differ from known techniques. According to techniques for EO filtering, EO classification may be based on a threshold, and Cr and Cb components may be classified with separate patterns (i.e., horizontal, vertical, 45 degree diagonal, and 135 degree diagonal). According to techniques for a converted image distortion measures, differences between original and reconstructed HDR image data can be summarized in a distortion measure that accounts for nonlinearities in an HDR image representation.

Figure 1A:
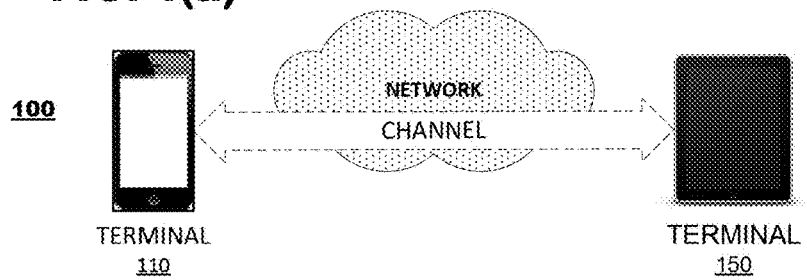
FIG. 1(a) is an example simplified block diagram of an example video delivery system.

FIG. 1(a) is a simplified block diagram of a video delivery system 100 according to an embodiment of the present disclosure. The system 100 may include a plurality of terminals 110, 150 interconnected via a network. The terminals 110, 150 may code video data for transmission to their counterparts via the network. Thus, a first terminal 110 may capture video data locally, code the video data, and transmit the coded video data to the counterpart terminal 150 via a channel. The receiving terminal 150 may receive the coded video data, decode it, and render it locally, for example, on a display at the terminal 150. If the terminals are engaged in bidirectional exchange of video data, then the terminal 150 may capture video data locally, code the video data, and transmit the coded video data to the counterpart terminal 110 via another channel. The receiving terminal 110 may receive the coded video data transmitted from terminal 150, decode it, and render it locally, for example, on its own display.

A video coding system 100 may be used in a variety of applications. In a first application, the terminals 110, 150 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 150). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1(a), the terminals 110, 150 are illustrated as smart phones and tablet computers, respectively, but the principles of the present disclosure are not so limited. Embodiments of the present disclosure also find application with computers (both desktop and laptop computers), computer servers, media players, dedicated video conferencing equipment, and/or dedicated video encoding equipment. Embodiments may be performed by instructions stored in memory and executed on computer processors, and may also be performed by special-purpose hardware.

The network represents any number of networks that convey coded video data between the terminals 110, 150, including, for example, wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

Figure 1B:
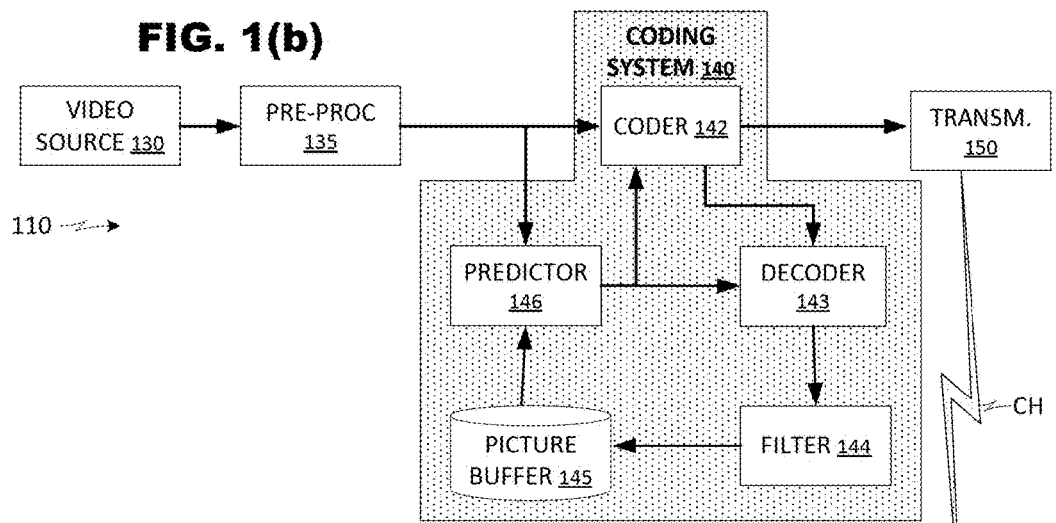
FIG. 1(b) is an example functional block diagram illustrating components of an example encoding terminal.

FIG. 1(b) is a functional block diagram illustrating components of an encoding terminal 110. The encoding terminal may include a video source 130, a pre-processor 135, a coding system 140, and a transmitter 150. The video source 130 may supply video to be coded. The video source 130 may be provided as a camera that captures image data of a local environment or a storage device that stores video from some other source. The pre-processor 135 may perform signal conditioning operations on the video to be coded to prepare the video data for coding. For example, the preprocessor 135 may alter frame rate, frame resolution, and other properties of the source video. The preprocessor 135 also may perform filtering operations on the source video.

The coding system 140 may perform coding operations on the video to reduce its bandwidth. Typically, the coding system 140 exploits temporal and/or spatial redundancies within the source video. For example, the coding system 140 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as: intra-coding, in which an input pixel block is coded differentially with respect to previously coded/decoded data of a common frame; single prediction inter-coding, in which an input pixel block is coded differentially with respect to data of a previously coded/decoded frame; bi-predictive inter-coding, in which an input pixel block is coded differentially with respect to data of a pair of previously coded/decoded frames; combined inter-intra coding, in which an input pixel block is coded differentially with respect to data from both a previously coded/decoded frame and data from the current/common frame; and multi-hypothesis inter-intra coding, in which an input pixel block is coded differentially with respect to data from several previously coded/decoded frames, as well as potentially data from the current/common frame. Pixel blocks also may be coded according to other coding modes. Any of these coding modes may induce visual artifacts in decoded images. Artifacts such as banding or ringing artifacts, and artifacts at edges in the pixel data may be particularly noticeable to the human visual system, and such artifacts may be mitigated with SAO filtering.

The coding system 140 may include a coder 142, a decoder 143, an in-loop filter 144, a picture buffer 145, and a predictor 146. The coder 142 may apply the differential coding techniques to the input pixel block using predicted pixel block data supplied by the predictor 146. The decoder 143 may invert the differential coding techniques applied by the coder 142 to a subset of coded frames designated as reference frames. The in-loop filter 144 may apply filtering techniques, including deblocking filtering, to the reconstructed reference frames generated by the decoder 143. The picture buffer 145 may store the reconstructed reference frames for use in prediction operations. The predictor 146 may predict data for input pixel blocks from within the reference frames stored in the picture buffer.

The transmitter 150 may transmit coded video data to a decoding terminal via a channel CH.

Figure 1C:
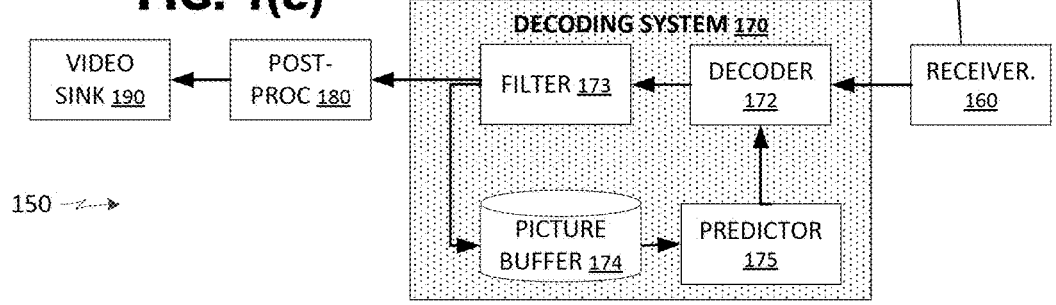
FIG. 1(c) is an example functional block diagram illustrating components of an example decoding terminal.

FIG. 1(c) is a functional block diagram illustrating components of a decoding terminal 150 according to an embodiment of the present disclosure. The decoding terminal may include a receiver 160 to receive coded video data from the channel, a video decoding system 170 that decodes coded data, a post-processor 180, and a video sink 190 that consumes the video data.

The receiver 160 may receive a data stream from the network and may route components of the data stream to appropriate units within the terminal 200. Although FIGS. 1(b) and 1(c) illustrate functional units for video coding and decoding, terminals 110, 120 typically will include coding/decoding systems for audio data associated with the video and perhaps other processing units (not shown). Thus, the receiver 160 may parse the coded video data from other elements of the data stream and route it to the video decoder 170.

The video decoder 170 may perform decoding operations that invert coding operations performed by the coding system 140. The video decoder may include a decoder 172, an in-loop filter 173, a picture buffer 174, and a predictor 175. The decoder 172 may invert the differential coding techniques applied by the coder 142 to the coded frames. The in-loop filter 144 may apply filtering techniques, including deblocking filtering, to reconstructed frame data generated by the decoder 172. For example, the in-loop filter 144 may perform various filtering operations (e.g., de-blocking, de-ringing filtering, sample adaptive offset processing, and the like). The filtered frame data may be output from the decoding system. The picture buffer 174 may store reconstructed reference frames for use in prediction operations. The predictor 175 may predict data for input pixel blocks from within the reference frames stored by the picture buffer according to prediction reference data provided in the coded video data.

The post-processor 180 may perform operations to condition the reconstructed video data for display. For example, the post-processor 180 may perform various filtering operations (e.g., de-blocking, de-ringing filtering, and the like), which may obscure visual artifacts in output video that are generated by the coding/decoding process. The post-processor 180 also may alter resolution, frame rate, color space, etc. of the reconstructed video to conform it to requirements of the video sink 190.

The video sink 190 represents various hardware and/or software components in a decoding terminal that may consume the reconstructed video. The video sink 190 typically may include one or more display devices on which reconstructed video may be rendered. Alternatively, the video sink 190 may be represented by a memory system that stores the reconstructed video for later use. The video sink 190 also may include one or more application programs that process the reconstructed video data according to controls provided in the application program. In some embodiments, the video sink may represent a transmission system that transmits the reconstructed video to a display on another device, separate from the decoding terminal. For example, reconstructed video generated by a notebook computer may be transmitted to a large flat panel display for viewing.

The foregoing discussion of the encoding terminal and the decoding terminal (FIGS. 1(b) and 1(c)) illustrates operations that are performed to code and decode video data in a single direction between terminals, such as from terminal 110 to terminal 150 (FIG. 1(a)). In applications where bidirectional exchange of video is to be performed between the terminals 110, 150, each terminal 110, 150 will possess the functional units associated with an encoding terminal (FIG. 1(b)) and each terminal 110, 150 also will possess the functional units associated with a decoding terminal (FIG. 1(c)). Indeed, in certain applications, terminals 110, 150 may exchange multiple streams of coded video in a single direction, in which case, a single terminal (say terminal 110) will have multiple instances of an encoding terminal (FIG. 1(b)) provided therein. Such implementations, although not illustrated in FIG. 1, are fully consistent with the present discussion.

FIG. 2 is a functional block diagram of a coding system 200 according to an embodiment of the present disclosure. The system 200 may include a pixel block coder 210, a pixel block decoder 220, an in-loop filter system 230, a prediction buffer 240, a predictor 250, a controller 260, and a syntax unit 270. The pixel block coder and decoder 210, 220 and the predictor 250 may operate iteratively on individual pixel blocks of a frame. The predictor 250 may predict data for use during coding of a newly-presented input pixel block. The pixel block coder 210 may code the new pixel block by predictive coding techniques and present coded pixel block data to the syntax unit 270. The pixel block decoder 220 may decode the coded pixel block data, generating decoded pixel block data therefrom. The in-loop filter 230 may perform various filtering operations on decoded frame data that is assembled from the decoded pixel blocks obtained by the pixel block decoder 220. The filtered frame data may be stored in the prediction buffer 240 where it may be used as a source of prediction of a later-received pixel block. The syntax unit 270 may assemble a data stream from the coded pixel block data which conforms to a governing coding protocol.

The pixel block coder 210 may include a subtractor 212, a transform unit 214, a quantizer 216, and an entropy coder 218. The pixel block coder 210 may accept pixel blocks of input data at the subtractor 212. The subtractor 212 may receive predicted pixel blocks from the predictor 250 and generate an array of pixel residuals therefrom representing a difference between the input pixel block and the predicted pixel block. The transform unit 214 may apply a transform to the pixel residual output from the subtractor 212 to convert the residual data from the pixel domain to a domain of transform coefficients. The quantizer 216 may perform quantization of transform coefficients output by the transform unit 214. The quantizer 216 may be a uniform or a non-uniform quantizer. The entropy coder 218 may reduce bandwidth of the output of the quantizer by coding the output, for example, by variable length code words. Elements of system 200, including deblocking filter 232, may conform to a video coding standard such as H.264 or H.265.

During operation, the quantizer 216 may operate according to coding parameters that govern each unit's operation. The quantizer 216 may operate according to a quantization parameter ($Q_P$) that determines a level of quantization to apply to the transform coefficients input to the quantizer 216. The quantization parameter may be selected by a controller 260 based on an estimate of a target bitrate that each coded frame should match and also based on analyses of each frame's image content. The quantization parameters $Q_P$ may be signaled in coded video data output by the coding system 200, either expressly or impliedly.

The transform unit 214 may operate in a variety of transform modes as events warrant. For example, the transform unit 214 may be selected to apply a DCT, a DST, a Walsh-Hadamard transform, a Haar transform, a Daubechies wavelet transform, or the like. In an embodiment, a controller 260 may select a coding mode M to be applied by the transform unit 214 and may configure the transform unit 214 accordingly. The coding mode M also may be signaled in the coded video data, either expressly or impliedly.

The pixel block decoder 220 may invert coding operations of the pixel block coder 210. For example, the pixel block decoder 220 may include a dequantizer 222, an inverse transform unit 224, and an adder 226. The pixel block decoder 220 may take its input data from an output of the quantizer 216. Although permissible, the pixel block decoder 220 need not perform entropy decoding of entropy-coded data since entropy coding is a lossless event. The dequantizer 222 may invert operations of the quantizer 216 of the pixel block coder 210. The dequantizer 222 may perform uniform or non-uniform de-quantization as specified by the decoded signal $Q_P$. Similarly, the inverse transform unit 224 may invert operations of the transform unit 214 and it may use the same transform mode M as its counterpart in the pixel block coder 210.

The adder 226 may invert operations performed by the subtractor 212. It may receive the same prediction pixel block from the predictor 250 that the subtractor 212 used in generating residual signals. The adder 226 may add the prediction pixel block to reconstructed residual values output by the inverse transform unit 224 and may output reconstructed pixel block data. Coding and decoding operations of the pixel block coder 210 and the pixel block decoder 220 are lossy processes and, therefore, decoded video data output by the pixel block decoder likely will exhibit some loss of content as compared to the input data that is supplied to the pixel block coder 210.

Where the pixel block coder 210 and pixel block decoder 220 operates on pixel block-sized increments of an image, the in-loop filter 230 may operate on reassembled frames made up of decoded pixel blocks. The in-loop filter 230 may perform various filtering operations on the reassembled frames. For example, the in-loop filter 230 may include a deblocking filter 232 and a sample adaptive offset ("SAO") filter 233. The deblocking filter 232 may filter data at seams between reconstructed pixel blocks to reduce discontinuities between the pixel blocks that arise due to coding losses. The deblocking filter may operate according to filtering parameters and may be designed for operation on data associated with a reference EOTF with a reference dynamic range domain. SAO filters may add offsets to pixel values according to an SAO "type," for example, based on edge direction/ shape and/or pixel/color component level. The in-loop filter 230 may operate according to parameters that are selected by the controller 260.

The prediction buffer 240 may store filtered frame data for use in later prediction of other pixel blocks. Different types of prediction data are made available to the predictor 250 for different prediction modes. For example, for an input pixel block, intra prediction takes a prediction reference from decoded data of the same frame in which the input pixel block is located. Thus, the prediction buffer 240 may store decoded pixel block data of each frame as it is coded. For the same input pixel block, inter prediction may take a prediction reference from previously coded and decoded frame(s) that are designated as "reference frames." Thus, the prediction buffer 240 may store these decoded reference frames.

As discussed, the predictor 250 may supply prediction data to the pixel block coder 210 for use in generating residuals. The predictor 250 may include an inter predictor 252, an intra predictor 253 and a mode decision unit 254. The inter predictor 252 may receive pixel block data representing a new pixel block to be coded and may search the prediction buffer 240 for pixel block data from reference frame(s) for use in coding the input pixel block. The inter predictor 252 may support a plurality of prediction modes, such as P mode coding and B mode coding. The inter predictor 252 may select an inter prediction mode and supply prediction data that provides a closest match to the input pixel block being coded. The inter predictor 252 may generate prediction reference indicators, such as motion vectors, to identify which portion(s) of which reference frames were selected as source(s) of prediction for the input pixel block.

The intra predictor 253 may support Intra (I) mode coding. The intra predictor 253 may search from among coded pixel block data from the same frame as the pixel block being coded that provides a closest match to the input pixel block. The intra predictor 253 also may generate prediction reference indicators to identify which portion of the frame was selected as a source of prediction for the input pixel block.

The mode decision unit 254 may select a final coding mode to be applied to the input pixel block. Typically, the mode decision unit 254 selects the prediction mode that will achieve the lowest distortion when video is decoded given a target bitrate. Exceptions may arise when coding modes are selected to satisfy other policies to which the coding system 200 adheres, such as satisfying a particular channel behavior, or supporting random access or data refresh policies. The mode decision unit 254 may output the prediction data to the pixel block coder and decoder 210, 220 and may supply to the controller 260 an identification of the selected prediction mode along with the prediction reference indicators corresponding to the selected mode.

The controller 260 may control overall operation of the coding system 200. The controller 260 may select operational parameters for the pixel block coder 210 and the predictor 250 based on analyses of input pixel blocks and also external constraints, such as coding bitrate targets and other operational parameters. As is relevant to the present discussion, when it selects quantization parameters QP, the use of uniform or non-uniform quantizers, and/or the transform mode M, it may provide those parameters to the syntax unit 270, which may include data representing those parameters in the data stream of coded video data output by the system 200. During operation, the controller 260 may revise operational parameters of the quantizer 216 and the transform unit 214 at different granularities of image data, either on a per pixel block basis or on a larger granularity (for example, per frame, per slice, per largest coding unit ("LCU") or another region).

Additionally, as discussed, the controller 260 may control operation of the in-loop filter 230 and the prediction unit 250. Such control may include, for the prediction unit 250, mode selection (lambda, modes to be tested, search windows, distortion strategies, etc.), and, for the in-loop filter 230, selection of filter parameters, reordering parameters, weighted prediction, etc.

Figure 3:
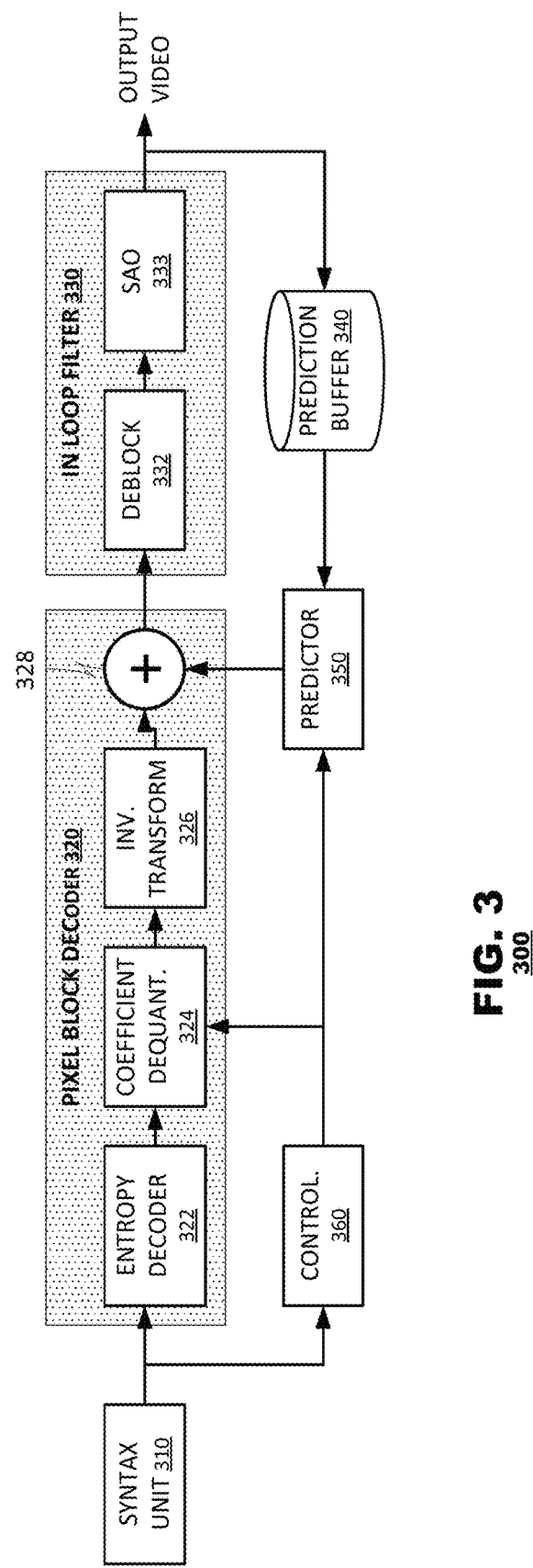
FIG. 3 is an example functional block diagram of an example decoding system.

FIG. 3 is a functional block diagram of a decoding system 300 according to an embodiment of the present disclosure. The decoding system 300 may include a syntax unit 310, a pixel-block decoder 320, an in-loop filter 330, a prediction buffer 340, a predictor 350 and a controller 360. The syntax unit 310 may receive a coded video data stream and may parse the coded data into its constituent parts. Data representing coding parameters may be furnished to the controller 360 while data representing coded residuals (the data output by the pixel block coder 210 of FIG. 2) may be furnished to the pixel block decoder 320. The pixel block decoder 320 may invert coding operations provided by the pixel block coder (FIG. 2). The in-loop filter 330 may filter reassembled frames built from decoded pixel block data. The filtered frame data may be output from the system 300 for display as output video. Filtered reference frames also may be stored in the prediction buffer 340 for use in prediction operations. The predictor 350 may supply prediction data to the pixel block decoder 320 as determined by coding data received in the coded video data stream. Elements of system 300, including deblocking filter 332, may conform to a video coding standard such as H.264 or H.265.

The pixel block decoder 320 may include an entropy decoder 322, a dequantizer 324, an inverse transform unit 326, and an adder 328. The entropy decoder 322 may perform entropy decoding to invert processes performed by the entropy coder 218 (FIG. 2). The dequantizer 324 may invert operations of the quantizer 216 of the pixel block coder 210 (FIG. 2). It may use the quantization parameters $Q_P$ and the quantizer mode data M that are provided in the coded video data stream. The adder 328 may invert operations performed by the subtractor 212 (FIG. 2). It may receive a prediction pixel block from the predictor 350 as determined by prediction references in the coded video data stream. The adder 328 may add the prediction pixel block to reconstructed residual values output by the inverse transform unit 326 and may output decoded pixel block data.

The in-loop filter 330 may perform various filtering operations on reconstructed pixel block data. As illustrated, the in-loop filter 330 may include a deblocking filter 332 and an SAO filter 333. The deblocking filter 332 may filter data at seams between reconstructed pixel blocks to reduce discontinuities between the pixel blocks that arise due to coding. The deblocking filter may operate according to filtering parameters and may be designed for operation on data associated with a certain EOTF with a certain dynamic range domain. SAO filters may add offset to pixel values according to an SAO type, for example, based on edge direction/shape and/or pixel level. Other types of in-loop filters may also be used in a similar manner. Operation of the deblocking filter 332 and the SAO filter 333 ideally would mimic operation of their counterparts in the coding system 200 (FIG. 2). Thus, in the absence of transmission errors or other abnormalities, the decoded frame data obtained from the in-loop filter 330 of the decoding system 300 would be the same as the decoded frame data obtained from the in-loop filter 230 of the coding system 200 (FIG. 2). In this manner, the coding system 200 and the decoding system 300 should store a common set of reference pictures in their respective prediction buffers 240, 340.

The prediction buffer 340 may store filtered pixel data for use in later prediction of other pixel blocks. The prediction buffer 340 may store decoded pixel block data of each frame as it is coded for use in intra prediction. The prediction buffer 340 also may store decoded reference frames.

As discussed, the predictor 350 may supply prediction data to the pixel block decoder 320. The predictor 350 may supply predicted pixel block data as determined by the prediction reference indicators supplied in the coded video data stream.

The controller 360 may control overall operation of the coding system 300. The controller 360 may set operational parameters for the pixel block decoder 320 and the predictor 350 based on parameters received in the coded video data stream. As is relevant to the present discussion, these operational parameters quantization parameters $Q_P$ and transform modes M for the inverse transform unit 326. As discussed, the received parameters may be set at various granularities of image data, for example, on a per pixel block basis, a per frame basis, a per slice basis, a per LCU basis, or based on other types of regions defined for the input image.

Figure 4:
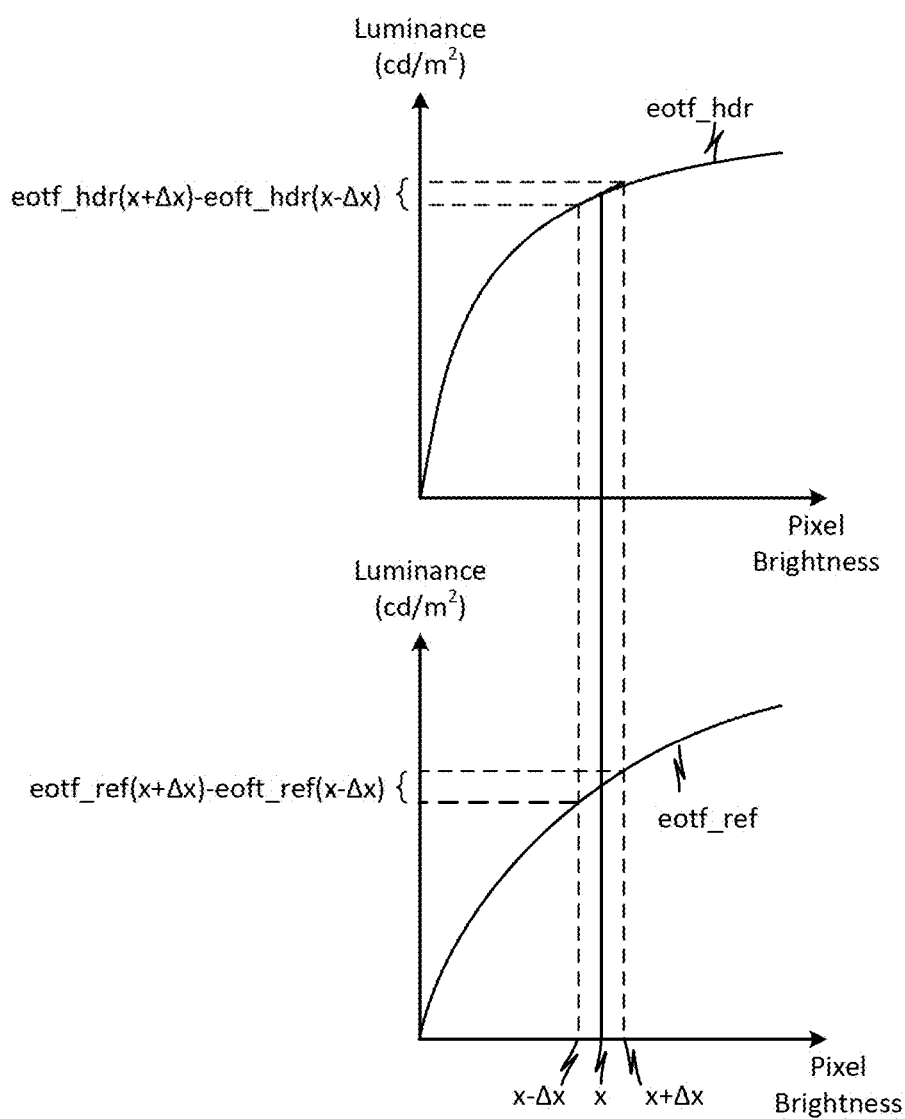
FIG. 4 is an example graph of linear luminance versus brightness of pixels in different EOTFs.

FIG. 4 is an example graph 400 of linear luminance versus brightness of pixels in different EOTFs. An example perceptually uniform reference EOTF (eotf ref in the figure; referred to as uniform_eotf elsewhere) and an example EOTF for an HDR image source (eotf_hdr in the figure; referred to as hdr_eotf elsewhere) are plotted with linear luminance (for example measured in $cd/m^2$) on the vertical axis against pixel brightness on the horizontal axis. A gradient (or slope) estimate for both HDR and reference EOTFs at a brightness x can be determined over a window defined by $\Delta x$ as the range of brightness values from $x-\Delta x$ to $x+\Delta x$.

Twenty-one methods for SAO filtering for compression of high dynamic range (HDR) video data are disclosed below. These methods may be used independently or in combination, for example, in a prediction loop of encoder 200 of FIG. 2 or the prediction loop of decoder 300 of FIG. 3. As an overview, these methods include techniques for band offset (BO) filtering (methods 1-15), edge offset (EO) filtering (methods 16-18), and for computing a distortion metric between original pixel data and reconstructed pixel data (methods 19-21).

For BO filter modes, the sample range of each component may be unequally divided into a number of bands based on the distribution of samples, the EOTF of an HDR image source, and one perceptually uniform EOTF. Each component (such as Y, Cr, and Cb) may have a different band configuration and different range for signaled offsets. A band configuration may include a number of bands, and the boundaries between bands. Each band may have an upper and lower boundary that defines a range of component amplitude values that are included in that band. For encoding efficiency, the range (maximum and minimum value) of offsets that can be signaled in a lookup table in an encoded bitstream may be limited. Each component may have a different number of bands, a different number of bands with signaled offsets (bands which have a corresponding offset signaled in an encoded bitstream), and a different range of values for the signaled offsets. In the selection of the starting band position for BO, different weights may be given to the rate-distortion (RD) cost of the bands based on the distribution of samples, the EOTF of HDR source, and one perceptually uniform EOTF.

For EO filtering mode, Cb and Cr may use separate syntax elements. In the sample classification for EO, the difference between the current sample and its neighbor may be compared with a threshold to determine whether it is a local valley, a local peak, a concave corner, a convex corner, or none of the above.

A distortion metric may be used, for example, in various SAO filter control decisions, such as in an encoder. Luma distortion may be converted to one in a perceptually uniform domain according to the EOTF of HDR source and one perceptually uniform EOTF. The chroma distortion is adjusted based on the distributions of chroma samples.

Method 1

For luma BO, the sample value range may be unequally divided into a number of bands according to the EOTF of an HDR source (denoted as hdr_eotf) and a perceptually uniform reference EOTF (denoted as uniform_eotf).

Assuming 10-bit samples are divided into N bands, the unequal band k includes the samples with luma values from L_k (lower end of band k) to U_k (upper end of band k), where k ranges from 0 to (N−1). The boundaries of band k, L_k and U_k, are:

$$L\_k = \text{inverse\_hdr\_eotf}(\text{uniform\_eotf}(\text{equal\_band\_width}*k))$$

$$U\_k = \text{inverse\_hdr\_eotf}(\text{uniform\_eotf}(\text{equal\_band\_width}*k + \text{equal\_band\_width} - 1))$$

where equal_band_width is the width of N equally sized bands (the width each band would have if there were N bands that all had equal width; for example, equal_band_width=$(2^{10})/N=1024/N$ for 10 bit video compression), and where inverse_hdr_eotf denotes the inverse function of the EOTF of the HDR source. Both the encoder and the decoder may perform the same division of bands. Other bit depths of luma samples is also possible, such as 8-bit and 12-bit.

Method 2

For luma BO, the bands may be specified at the encoder according to the distribution of luma samples, the EOTF of HDR source and a perceptually uniform EOTF. The number of bands and the division of the bands are delivered in the bitstream for each sequence, each frame, or each slice. The distribution of luma across the range of possible luma values may be estimated based on analysis of a portion of source video data.

Method 3

For luma BO, multiple band configurations may be specified by an encoder in an encoded bitstream, where each band configuration includes a number of bands and boundaries for those bands. The multiple configurations may be selected by an encoder according to the distribution of luma sample values, the EOTF of an HDR source, and a perceptually uniform EOTF. For example, a first set of bands may be selected based on the distribution of sample values in one portion of HDR source image data, while a second set of bands may be selected based on the distribution of sample values in a different portion of the HDR source image data. In some embodiments, all configurations, including numbers of bands and all specifications of band boundaries may be delivered in the bitstream for each encoded image sequence. In some embodiments, only the numbers of bands for each configuration may be signed in the bitstream while the band boundaries may be implied and may be calculated at both encoder and decoder, for example, using the boundary equations in Method 1 above. And in other embodiments, a plurality of band configurations, including a number of bands and boundaries for those bands in each configuration, may be implied without signaling in the encoded bitstream and may be calculated at both an encoder and a decoder.

An encoder can select which of the signaled band configuration are applied to a particular portion of image data, and that selection may be signaled in the encoded bitstream for that particular image portion. For example, an encoder may select on a per-frame, per-slice, or per-coding unit basis, which band configuration will be applied to that portion of image data. The selected configuration may be signaled in the encoded bitstream for that image portion, for example as an index into a table of band configurations.

Method 4

For luma BO, multiple available band configurations may be signaled in an encoded bitstream or implied as in Method 3. Specification in a bitstream of which configuration to apply to a particular portion of image data may be implicit. Without explicitly signally a band configuration selection in an encoded bitstream, a decoder may infer which band configuration selection to apply to a particular image portion based on other data in the encoded bitstream. Which of the available band configurations are applied to a particular portion of image data may be determined by spatial and temporal neighbors at both encoder and decoder. For example, each frame, each slice or each coding unit may have one band configuration selected based on its spatial and temporal neighbors at both encoder and decoder.

Method 5

For chroma BO, the Cb and Cr sample value ranges are may be divided into a number of unequal bands based on the distributions of chroma sample values. For example, the sample distance from the mid-point of the chroma sample range (i.e., 512 for 10 bit video samples). The sub-range closer to the mid-point may have more bands than the sub-range farther away from the mid-point.

For example, [0, 512) is divided into (N/2) bands, and the width of the bands are equal_band_width*b_0, equal_band_width*b_1, . . . equal_band_width*b_((N/2)−1). b_0, b_1, . . . b_((N/2)−1) get decreased. [512, 1024) is divided into (N/2) bands, and the width of the bands are equal_band_width*b_(N/2), equal_band_width*b_((N/2)+1), . . . equal_band_width*b_(N−1). b_(N/2), b_((N/2)+1), . . . b_(N−1) get increased.

Method 6

For chroma BO, a band configuration may be specified at an encoder according to the distribution of chroma samples. The number of bands and the division of bands may be delivered in the bitstream for each chroma component, for example, for each sequence, each frame, or each slice.

Method 7

For chroma BO, a plurality of band configurations may be specified at an encoder according to the distribution of chroma samples. In some embodiments, all numbers of bands and all specifications of band division may be delivered in the bitstream for each sequence. In some embodiments, only the numbers of bands for each configuration may be signed in the bitstream while the band boundaries may be implied and may be calculated at both encoder and decoder, for example, using Method 5 above. And in other embodiments, multiple band configurations, including a number of bands and boundaries for those bands in each configuration, may be implied without signaling in the encoded bitstream and may be calculated at both an encoder and a decoder.

An encoder may select a band configuration separately for each chroma component for an image portion and signal that selection in an encoded bitstream. For example, a band configuration selection can be made for each frame, each slice, or each coding unit and the selection may be made separately for each chroma component, and the band configurations for the two chroma components (Cr and Cb) are not the same.

Method 8

For chroma BO, a plurality of band configurations may be specified at an encoder according to the distribution of chroma samples. All numbers of bands and all specifications of band division may be signaled in an encoded bitstream or implied as in Method 7. Selection of which band configuration to apply to a particular image area may be done implicitly. For example, each chroma component of each frame, each slice, or each coding unit may have a configuration selected based on its spatial and temporal neighbors at both encoder and decoder.

Method 9

An SAO filter in an encoder or decoder may use a band configuration such that at least one chroma component has more bands than the luma component. The number of bands for BO mode filtering for at least one chroma components (i.e., Cb and Cr) may be more than the number of bands for a luma component in BO mode filtering. Additionally, for BO mode, an encoder may signal more band offsets for chroma than for luma and filtering may modify more bands of samples than luma.

Method 10

An encoder and decoder may coordinate SAO filter parameters in a variety of ways. For example, in a fixed band configuration embodiment, a band configuration, including the number of bands, may be fixed and known beforehand such that no communication about band configuration need be communicated in encoded bitstream. In an explicit band configuration embodiment, a band configuration may be explicitly encoded into the bitstream, such that some element of the encoded bitstream syntax directly specifies a band configuration, including the number of bands. In an implicit band configuration embodiment, a band configuration may be implied by other information in an encoded bitstream such as pixel data, other coding parameters that control elements of the decoding process other than SAO filtering, or coding parameters from temporal and spatial neighbors of the current image portion that controls elements of SAO filtering.

Each YCbCr component may have a different number of bands. The number could be specified at both encoder and decoder. The number could also be specified at encoder and delivered in the bitstream for each component of each sequence, each frame, or each slice. Each component of each sequence, each frame, each slice, or each coding unit could derive it based on its spatial and temporal neighbors at both encoder and decoder.

Method 11

The number of band offsets signaled in an encoded bitstream may vary. As with band configurations in Method 10 above, an encoder and decoder may coordinate numbers of signaled band offsets used for SAO filtering in a variety of ways, including fixed specification of numbers of signaled offsets, numbers of signaled offsets signaled explicitly in an encoded bitstream, and numbers of signaled offsets implied implicitly in an encoded bitstream.

Each YCbCr component may have a different number of signaled bands. The number could be specified at both encoder and decoder. The number could also be specified at encoder and delivered in the bitstream for each component of each sequence, each frame, or each slice. Each component of each sequence, each frame, each slice, or each coding unit could derive it based on its spatial and temporal neighbors at both encoder and decoder.

Method 12

The possible range (maximum and minimum values) of a signaled offset for SAO filtering may be different for each pixel component. The offset ranges may also be fixed, explicitly encoded, or implicitly encoded.

Each YCbCr component may have different allowed range for BO values. The allowed range value could be specified at both encoder and decoder. It could also be specified at encoder and delivered in the bitstream for each component of each sequence, each frame, or each slice. Each component of each sequence, each frame, each slice, or each coding unit could derive it based on its spatial and temporal neighbors at both encoder and decoder.

Method 13

The possible ranges of signaled offsets for SAO filtering may be fixed in a known table at the encoder and decoder. A particular range to be used for a portion of encoded data may be signaled by an encoder explicitly as an index into the known table in the encoded bitstream.

Each YCbCr component may have different allowed range for BO values. A group of allowed range values is predefined at both encoder and decoder. Each component of each sequence, each frame, each slice, or each coding unit selects one range value and sends the index in the bitstream. Each component of each sequence, each frame, each slice, or each coding unit could also derive it based on its spatial and temporal neighbors at both encoder and decoder.

Method 14

An encoder may choose SAO filter parameters based on a rate-distortion cost per band and a comparison of a gradient of HDR EOTF at an average luma sample value in the band and a gradient of a reference EOTF at a corresponding average luma sample value, where the average luma sample value achieves the same linear luminance through an HDR EOTF as what the corresponding average luma sample value achieves through a reference EOTF.

For example, in the selection of starting band position for luma, the rate-distortion (RD) cost for band i (denoted as RD_i) is multiplied by a weighting factor f_i, then (RD_i*f_i) is utilized to select the first band that is signaled where the signaled bands are continuous. f_i depends on the gradient of HDR EOTF at the average luma sample in the band i (denoted as slope_hdr) and the gradient of a perceptually uniform EOTF at the corresponding average luma sample (denoted as slope_uniform), where the average luma sample value achieves the same linear luminance through a HDR EOTF as what the corresponding average luma sample value achieves through a reference EOTF. For example, when slope_hdr>slope_uniform, f_i<1; when slope_hdr<=slope_uniform, f_i>=1. The weighting factor f_i gets smaller as the ratio (slope_hdr/slope_uniform) gets larger.

Method 15

An encoder may choose SAO filter parameters based on a rate-distortion cost per band and the distribution of chroma samples in an HDR source, for example the sample distance between the average chroma sample value in the band and the mid-point of chroma sample range.

For example, in the selection of starting band position for chroma, the RD cost for band i (denoted as RD_i) is multiplied by a weighting factor f_i, then (RD_i*f_i) is utilized to select the starting band position for signaling (the first band that with a signaled offset, where the signaled bands are continuous). f_i depends on the distribution of samples. For example, f_i depends on the sample distance between the average chroma sample in the band i and the mid-point of chroma sample range (e.g., 512 for 10 bit video compression). f_i gets smaller as the distance decreases.

Method 16

An SAO filter in EO mode may classify chroma components (Cr and Cb) of a pixel block separately, and may apply an EO mode filter according to separate classifications. An encoder may signal EO mode classification patterns in separate syntax elements of an encoded bitstream syntax for Cb and Cr.

For edge offset (EO), Cb and Cr may use separate syntax elements for EO class patterns (e.g., horizontal, vertical, 45 degree diagonal, 135 degree diagonal).

Method 17

A window or threshold may be used to classify luma samples of image data for an SAO filter in EO mode. HEVC classifies luma samples in one block by testing if that each pixel value is equal to, greater than, or less than the value of a neighboring pixel, so that the pixels are classified into five categories including local peak, local valley, concave corner, convex corner and none of above. Instead of testing equality, classification may be done using a window around a current pixel value. For example, EO mode classification may be based on if a neighboring pixel value is within a window (a range) of pixel values of a current pixel value, and the window size may be defined by a threshold.

For example, in the sample classification for luma EO, if the difference between current sample (denoted as c) and its neighboring sample (denoted as a) is smaller than a threshold, it is considered to be "c=a". Otherwise, it is considered as "c<a" or "c>a". The threshold (denoted as thresh) is determined based on the gradient of a HDR EOTF at current sample c (denoted as slope_hdr) and the gradient of a perceptually uniform EOTF at corresponding current sample (denoted as slope_uniform), where the current sample c achieves the same linear luminance through a HDR EOTF as what the corresponding sample achieves through a reference EOTF. For example, the threshold gets smaller as the ratio (slope_hdr/slope_uniform) gets larger.

The threshold could be specified at both encoder and decoder. It could also be chosen at encoder and signaled in the bitstream for each sequence, each frame, or each slice.

Method 18

Chroma sample classification for SAO filtering in EO mode may be done with a window or threshold as in the luma sample classification of Method 17.

For example, the sample classification for chroma EO, if the difference between current sample (denoted as c) and its neighboring sample (denoted as a) is smaller than a threshold, it is considered to be "c=a". Otherwise, it is considered as "c<a" or "c>a". The threshold is determined based on the distribution of samples. For example, the threshold (denoted as thresh) is determined based on the distance between the current sample and the mid-point of chroma sample range (e.g., 512 for 10 bit video compression). The threshold gets smaller as the distance gets decreased.

The threshold could be specified at both encoder and decoder. It could also be chosen at encoder and signaled in the bitstream for each component of each sequence, each frame, or each slice.

Method 19

An HDR distortion metric for measuring differences between an HDR source pixel and a reconstructed version of the source pixel may be based on a comparison of gradients of an HDR EOTF and a perceptually uniform EOTF. A reconstructed version of a source pixel may be obtained, for example, by compressing and decompressing an image containing the pixel. Such an HDR distortion metric may be used to make encoding decisions in an encoder, including selection of any SAO filter parameters.

For example, in all SAO decisions, the luma distortion is converted to the one in a perceptually uniform domain according to the EOTF of HDR source and a perceptually uniform EOTF. The difference between the reconstructed samples and the source samples (denoted as diff_hdr) is converted to the difference in perceptually uniform domain (denoted as diff_uniform) as:

$$\text{diff\_uniform} = \text{diff\_hdr} * \frac{\text{slope\_hdr(average brightness)}}{\text{slope\_uniform(corresponding average brightness)}}$$

where slope_hdr denotes the gradient of an HDR EOTF at the average brightness of the block, and slope_uniform denotes the gradient of a perceptually uniform EOTF at the corresponding average brightness. Then diff_uniform may be used in any SAO filtering decisions.

The corresponding average brightness for a perceptually uniform source may be calculated as:

corresponding average brighness=oetf_uniform
(eotf_hdr(average brightness))

where eotf_hdr( ) denotes the EOTF in HDR processing, and oetf_uniform( ) is the optical-electro transfer function (OETF) of a perceptually uniform reference to convert linear luminance to digital code words (where generally an OETF is the inverse of an EOTF). The average brightness achieves the same linear luminance through HDR EOTFs as what the corresponding brightness achieves through a reference EOTF.

Method 20

In an example for luma, in all SAO decisions, the luma distortion (denoted as dist) is multiplied by a weighting factor w, then (dist*w) is utilized. The weight factor w depends on the gradient of a HDR EOTF at the average brightness of the block (denoted as slope_hdr) and the gradient of a perceptually uniform EOTF at the corresponding average brightness (denoted as slope_uniform). For example, when slope_hdr>slope_uniform, w>1; when slope_hdr<=slope_uniform, w<=1. The weighting factor w gets larger as the ratio (slope_hdr/slope_uniform) gets larger.

Method 21

In an example for chroma, in all SAO decisions, the chroma distortion (denoted as dist) is multiplied by a weighting factor w, then (dist*w) is utilized. For example, the weight factor w depends on the sample distance between the average chroma sample in the block and the mid-point of chroma sample range (e.g., 512 for 10 bit video compression). The weighting factor w gets larger as the distance decreases.

Figure 5:
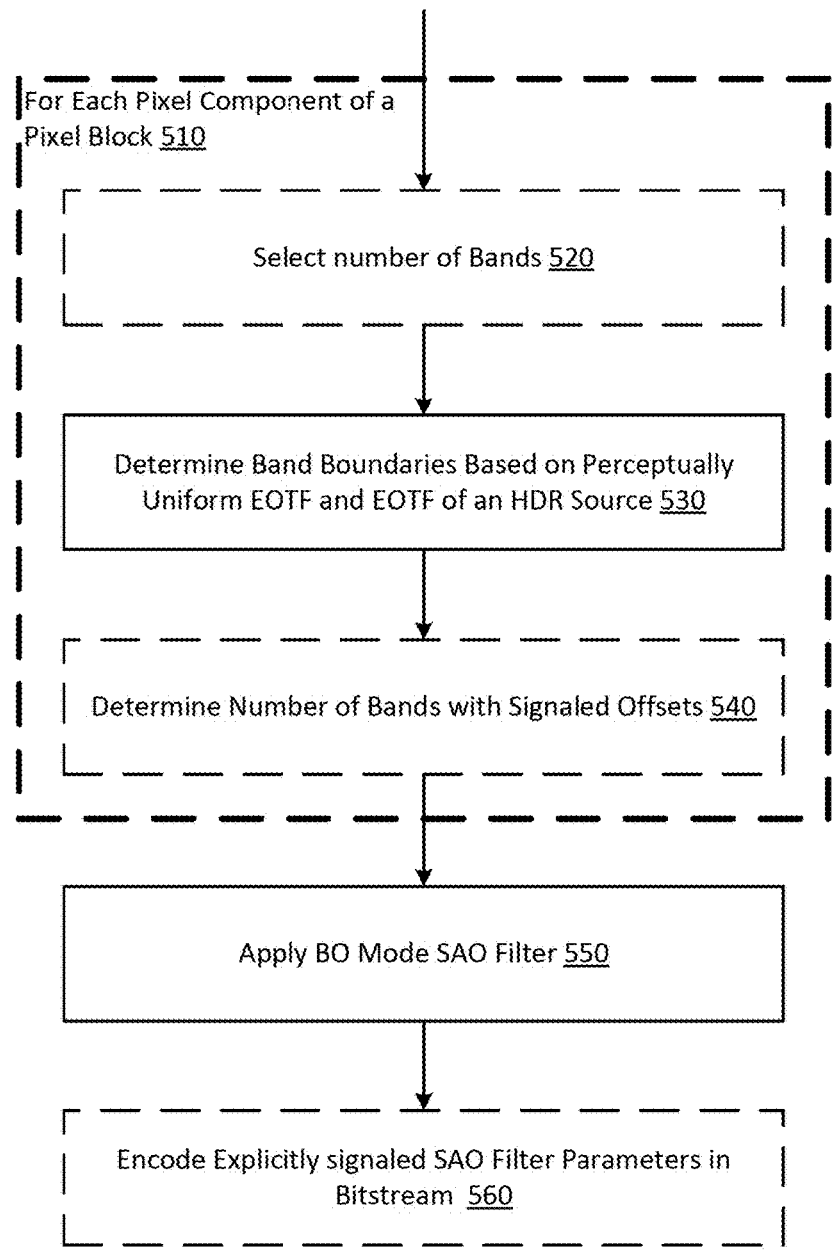
FIG. 5 is an example process for BO mode filtering.

FIG. 5 is an example process 500 for BO mode filtering. Box 510 is optionally repeated for every pixel component (such as Y, Cr, and Cb) of an input pixel block. In box 520, a number of bands is optionally selected for the band offset mode. Band boundaries are determined in box 530 based on a perceptually uniform EOTF and an EOTF of an HDR source. The number of bands with signaled offsets may optionally be determined in box 540. In box 550, an SAO filter is applied in BO mode. Note that boxes 510-550 may be implemented in inside a motion prediction loop of either an encoder or a decoder. In optional box 560, if method 500 is implemented as part of an encoder, SAO filter parameters may be explicitly encoded into a compressed bitstream.

Figure 6:
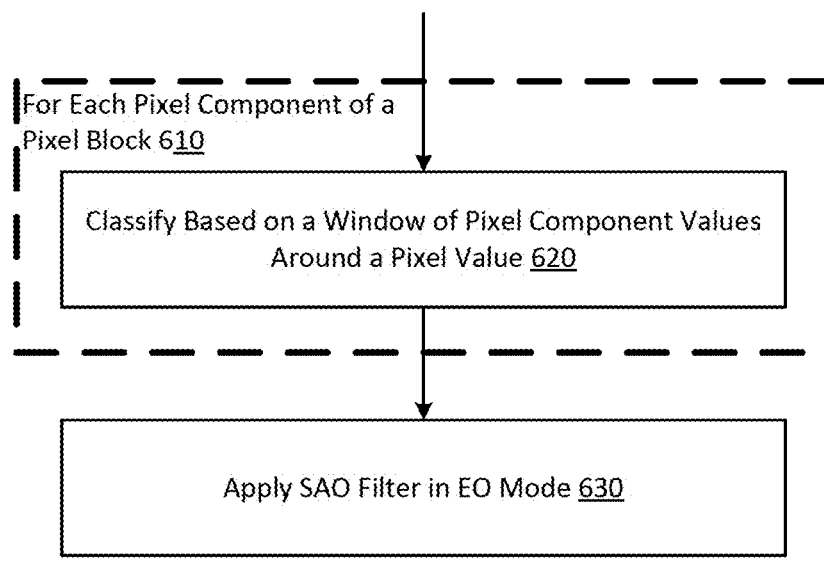
FIG. 6 is an example process for EO mode filtering.

FIG. 6 is an example process 600 for EO mode filtering. Box 610 is optionally repeated for every pixel component (such as Y, Cr, and Cb) of an input pixel block. In box 610, the pixels in the component of the pixel block are classified based on a window of pixel component values around each pixel value. In some embodiments, the window may be defined by a threshold. In box 630, the SAO filter is applied in EO mode using the classifications determined in box 620.

Figure 7:
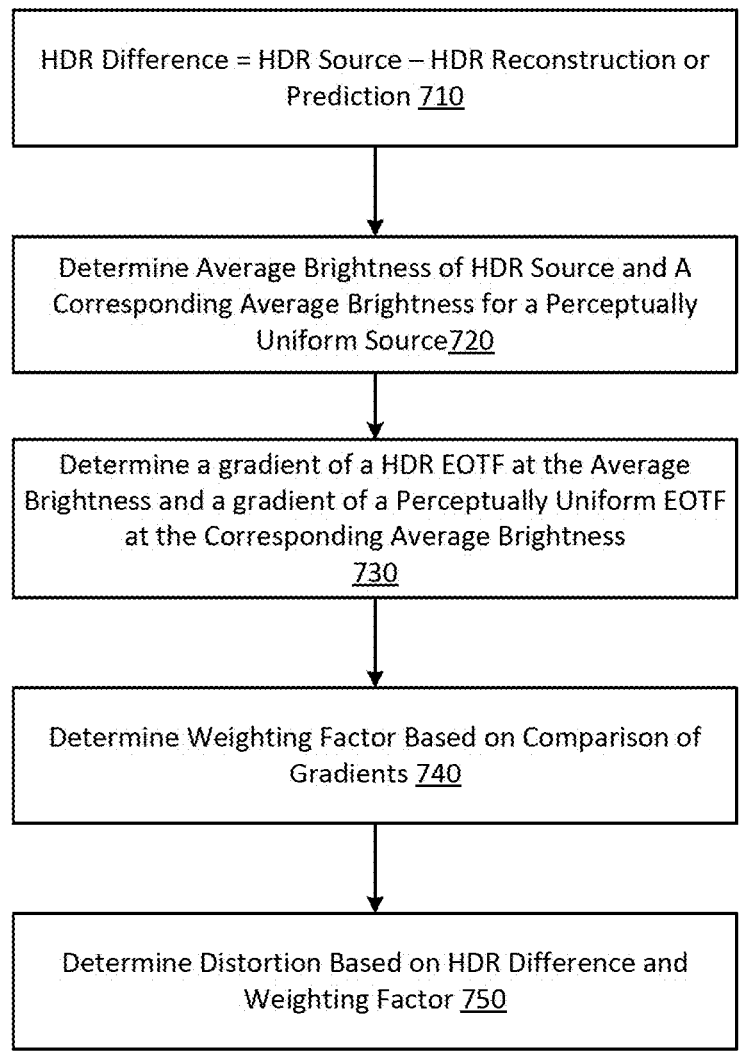
FIG. 7 is an example process for determining distortion during compression of HDR image data.

FIG. 7 is an example process for determining distortion during compression of an HDR image source. In box 710, a difference between an HDR source pixel value and either reconstructed or predicted pixel value is calculated. In box 720, an average brightness for an HDR source and a corresponding brightness are determined. The average brightness for the HDR source may be determined, for example by averaging the luma pixel values in a pixel block. A corresponding average brightness for a perceptually uniform source may be determined from the HDR average brightness as explained above in Method 19. In box 730, a gradient (or slope) is determined of the EOTF for the HDR source at the HDR average brightness, and a gradient is determined of a perceptually uniform EOTF at the corresponding average brightness. In box 740 a weighting factor is determined based on a comparison of the gradients determined in box 730. For example, a weighting factor may be based on a ratio of the gradients determined in box 730, or may be determined as described above in Methods 20, 21, or 22. In box 750, a distortion may be determined based on the HDR difference calculated in box 710 and the weighting factor calculated in box 740. For example, the distortion may be equal to the weighting factor*the HDR difference, as described above in Methods 20, 21, or 22.

As discussed above, FIGS. 1(a), 1(b), and 1(c) illustrate functional block diagrams of terminals. In implementation, the terminals may be embodied as hardware systems, in which case, the illustrated blocks may correspond to circuit sub-systems. Alternatively, the terminals may be embodied as software systems, in which case, the blocks illustrated may correspond to program modules within software programs executed by a computer processor. In yet another embodiment, the terminals may be hybrid systems involving both hardware circuit systems and software programs. Moreover, not all of the functional blocks described herein need be provided or need be provided as separate units. For example, although FIG. 1(b) illustrates the components of an exemplary encoder, including components such as the pre-processor 135 and coding system 140, as separate units. In one or more embodiments, some components may be integrated. Such implementation details are immaterial to the operation of the present invention unless otherwise noted above. Similarly, the encoding, decoding and post-processing operations described with relation to FIGS. 6, 7, and 8 may be performed continuously as data is input into the encoder/decoder. The order of the steps as described above does not limit the order of operations.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for filtering image data, comprising:
   determining upper and lower boundaries of a band for of a sample adaptive offset (SAO) filter having N unequal bands based on a perceptually uniform electro-optical transfer function (EOTF) and an inverse of the EOTF of an high dynamic range (HDR) image source; and
   SAO filtering a source pixel in band offset (BO) mode by determining if the source pixel value falls within the upper and lower boundaries of the band, and adding to the pixel value an offset associated with the band.

2. The method of claim 1, wherein the boundaries of a band k are determined as $L\_k = \text{inverse\_hdr\_eotf}(\text{uniform\_eotf}(\text{equal\_band\_width}*k))$ and $U\_k = \text{inverse\_hdr\_eotf}(\text{uniform\_eotf}(\text{equal\_band\_width}*k + \text{equal\_band\_width} - 1))$ where L_k is the lower boundary of band k, U_k is the upper boundary of band k, inverse_hdr_eotf is the inverse of the EOTF of the HDR image source, uniform_eotf is a perceptually uniform EOTF, and equal_band_width is the width of N equally sized bands.

3. The method of claim 1, wherein the number N of bands is determined based on a statistical analysis of pixel values of the HDR image source.

4. The method of claim 1, wherein the number N is determined by an entry in a lookup table in an encoded bitstream.

5. The method of claim 1, wherein a selection of band configuration amongst a set of available band configurations is determined by spatial and temporal neighbors of an image portion containing the source pixel.

6. The method of claim 1, wherein a band configuration for luma is determined separately from a band configuration for chroma, where a band configuration include a number of bands and band boundaries.

7. The method of claim 6, wherein the number of bands for at least one chroma component is greater than the number of bands for a luma component.

8. The method of claim 1, wherein the number of bands with an offset signaled in a bitstream for at least one chroma component is different from the number of bands with an offset signaled in the bitstream for a luma component.

9. The method of claim 1, further comprising:
   determining a distortion metric between HDR image source pixels and corresponding reconstructed pixels based on a comparison of gradients of the EOTF of the HDR image source and a perceptually uniform EOTF.

10. A system for filtering image data, comprising a processor and a storage device containing instructions, that when executed by the processor, cause at least:
    determining upper and lower boundaries of a band for of a sample adaptive offset (SAO) filter having N unequal bands based on a perceptually uniform electro-optical transfer function (EOTF) and an inverse of the EOTF of an high dynamic range (HDR) image source; and
    SAO filtering a source pixel in band offset (BO) mode by determining if the source pixel value falls within the upper and lower boundaries of the band, and adding to the pixel value an offset associated with the band.

11. The system of claim 10, wherein the boundaries of a band k are determined as $L\_k = \text{inverse\_hdr\_eotf}(\text{uniform\_eotf}(\text{equal\_band\_width}*k))$ and $U\_k = \text{inverse\_hdr\_eotf}(\text{uniform\_eotf}(\text{equal\_band\_width}*k + \text{equal\_band\_width} - 1))$ where L_k is the lower boundary of band k, U_k is the upper boundary of band k, inverse_hdr_eotf is the inverse of the EOTF of the HDR image source, uniform_eotf is a perceptually uniform EOTF, and equal_band_width is the width of N equally sized bands.

12. The system of claim 10, wherein the number N of bands is determined based on a statistical analysis of pixel values of the HDR image source.

13. The system of claim 10, wherein the number N is determined by an entry in a lookup table in an encoded bitstream.

14. The system of claim 10, wherein a selection of band configuration amongst a set of available band configurations is determined by spatial and temporal neighbors of an image portion containing the source pixel.

15. A non-transitory computer readable media comprising instructions that when executed by a processor, cause at least:
    determining upper and lower boundaries of a band for of a sample adaptive offset (SAO) filter having N unequal bands based on a perceptually uniform electro-optical transfer function (EOTF) and an inverse of the EOTF of an high dynamic range (HDR) image source; and
    SAO filtering a source pixel in band offset (BO) mode by determining if the source pixel value falls within the upper and lower boundaries of the band, and adding to the pixel value an offset associated with the band.

16. The non-transitory computer readable media of claim 15, where in the boundaries of a band k are determined as $L\_k = \text{inverse\_hdr\_eotf}(\text{uniform\_eotf}(\text{equal\_band\_width}*k))$ and $U\_k = \text{inverse\_hdr\_eotf}(\text{uniform\_eotf}(\text{equal\_band\_width}*k + \text{equal\_band\_width} - 1))$ where L_k is the lower boundary of band k, U_k is the upper boundary of band k, inverse_hdr_eotf is the inverse of the EOTF of the HDR image source, uniform_eotf is a perceptually uniform EOTF, and equal_band_width is the width of N equally sized bands.

* * * * *